United States Patent
Manaka

(10) Patent No.: US 6,946,813 B2
(45) Date of Patent: Sep. 20, 2005

(54) STEP MOTOR CONTROL DEVICE AND ELECTRONIC TIMEPIECE EQUIPPED WITH STEP MOTOR CONTROL DEVICE

(75) Inventor: Saburo Manaka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 13 days.

(21) Appl. No.: 10/784,423

(22) Filed: Feb. 23, 2004

(65) Prior Publication Data

US 2004/0178762 A1 Sep. 16, 2004

(30) Foreign Application Priority Data

Feb. 24, 2003 (JP) ........................................ 2003-045895

(51) Int. Cl.[7] .............................................. G05B 19/40
(52) U.S. Cl. ...................... 318/685; 318/696; 368/217; 368/218; 368/219; 368/188
(58) Field of Search ................. 318/685, 696; 368/217, 218, 219, 188, 85, 86

(56) References Cited

U.S. PATENT DOCUMENTS

| | | | | |
|---|---|---|---|---|
| 4,204,397 A | * | 5/1980 | Asano et al. ............... | 368/202 |
| 4,217,751 A | * | 8/1980 | Torisawa et al. ............... | 368/76 |
| 4,271,496 A | * | 6/1981 | Shida et al. ................... | 368/80 |
| 4,312,059 A | * | 1/1982 | Mandai et al. ............... | 368/157 |
| 4,326,278 A | * | 4/1982 | Shida et al. ................. | 368/157 |
| 4,340,946 A | * | 7/1982 | Kanno et al. .................. | 368/76 |
| 4,361,410 A | * | 11/1982 | Nakajima et al. ............ | 368/157 |
| 4,382,691 A | * | 5/1983 | Shida et al. .............. | 368/157 |
| 4,405,510 A | * | 9/1983 | Boden ........................... | 512/26 |
| 4,430,007 A | * | 2/1984 | Wiget et al. ................. | 368/157 |
| 4,433,918 A | * | 2/1984 | Nishimura et al. ............ | 368/74 |
| 4,760,564 A | * | 7/1988 | Odagiri ......................... | 368/66 |
| 5,195,063 A | * | 3/1993 | Moriya .......................... | 368/85 |

* cited by examiner

*Primary Examiner*—Rita Leykin
(74) *Attorney, Agent, or Firm*—Adams & Wilks

(57) ABSTRACT

A step motor control device detects a rotational driving state of a step motor. In a first detection period immediately after termination of the rotational driving state of the step motor, selected switch elements are controlled so that a first detection signal is obtained. If the step motor is not in a rotational driving state, the first detection signal is suppressed to a low voltage that is equal to or lower than a threshold value. In a second detection period immediately after lapse of the first detection period, selected switch elements are controlled so that a second detection signal of high and stable voltage is obtained in accordance with the rotational driving state of the step motor.

20 Claims, 5 Drawing Sheets

STEP MOTOR CONTROL DEVICE AND ELECTRONIC TIMEPIECE EQUIPPED WITH STEP MOTOR CONTROL DEVICE

BACKGROUND OF THE INVENTION

1. Field of the Invention

The present invention relates to a step motor control device that rotationally drives a step motor and detects the presence/absence of the rotation of the step motor, and to an electronic timepiece utilizing the step motor control device.

2. Description of the Prior Art

In an electronic timepiece, a step motor is used as a motor that rotationally drives time hands such as an hour hand or a minute hand.

FIG. 5 is a front view showing a step motor used in such electronic timepiece having an hour hand or a minute hand and described in JP57-18440 B (pgs. 1–2. FIG. 1) (hereinafter "Patent Document 1").

In FIG. 5, the step motor includes a stator 501 made of a magnetic material, a coil 207 wound around on the stator 501, and a bipolar rotor 502 disposed within the stator 501. In the stator 501, there are saturable portions 503, 504 and inner notches 505 and 506 for determining a stop position of the rotor 502.

When a drive pulse of a rectangular wave is supplied to the coil 207 to allow a current i to flow in a direction indicated by an arrow in FIG. 5, a magnetic flux develops in the stator 501 in the direction indicated by the arrow. As a result, the saturable portions 503 and 504 are first saturated, and thereafter the rotor 502 rotates in the direction indicated by the arrow (counterclockwise) in FIG. 5 by 180 degrees due to the interactions between a magnetic pole developed in the stator 501 and a magnetic pole developed in the rotor 502. Subsequently, a pulse current different in the polarity is alternately allowed to flow in the coil 207, to thereby conduct the same operation as the above and rotate the rotor 502 counterclockwise in increments of 180 degrees.

FIG. 6 is a circuit diagram showing a conventional step motor control device for conducting the rotation control of the step motor. The circuit is structured such that a rotation drive circuit and a rotation detecting circuit are integrated together (for example, refer to Patent Document 1).

In FIG. 6, p-channel MOS transistors Q1, Q2 and n-channel MOS transistors Q3, Q4 are structural elements of the motor drive circuit, and the coil 207 of the step motor is connected between a source connection point of the transistor Q1 and the transistor Q3 and a source connection point of the transistor Q2 and the transistor Q4.

On the other hand, a detection resistor 208 connected in series with the n-channel MOS transistors Q3 to Q6 and the transistor Q5, a detection resistor connected in series with the transistor Q6, and a comparator 210 are structural elements of the rotation detecting circuit.

The gates of the respective transistors Q1 to Q6 are connected to a control circuit 103. A connection point OUT2 of the detection resistor 208 and the coil 207 and a connection point OUT1 of the detection resistor 209 and the coil 207 are connected to an input section of the comparator 210. Also, the input section of the comparator 210 is inputted with a predetermined threshold voltage Vss.

FIG. 7 is a timing chart for the case of conducting rotation control and detection control in the step motor control device shown in FIG. 6.

The operation of the conventional step motor control device structured as described above will be described with reference to FIGS. 5 to 7. First, when a drive pulse P1 is supplied to an input section Vi of the control circuit 103, the transistors Q2 and Q3 become an on-state under the control by the control circuit 103. As a result, a current flows in the coil 207 in a direction indicated by an arrow, and the rotor 502 rotates counterclockwise as shown in FIG. 5.

On the other hand, a non-detection period IT, which is a period during which the rotation of the step motor is not detected, is provided for a given period T7 immediately after the motor drive period, and a rotation detection period DT for detecting whether or not the step motor rotates is provided for a given period T8 immediately after the non-detection period IT.

In the rotation detection period DT, a rotation detection control pulse SP1 is supplied to the input section Vi of the control circuit 103. The control circuit 103 controls the on/off operation of the transistor Q4 at a given frequency in a state where the transistors Q3 and Q4 turn on in response to the rotation detection control-pulse SP1.

In this situation, a detection signal V8 is taken out from the connection point OUT1 of the rotation detection resistor 209 and the coil 207. The detection signal having a waveform shown in FIG. 7 is obtained as the detection signal V8. In FIG. 7, the detection voltage V8 lower than VDD is generated when the rotor 502 vibrates counterclockwise in FIG. 5, and the detection voltage V8 higher than VDD is generated when the rotor 502 vibrates clockwise in FIG. 5.

In the case where the rotor 502 rotates, the detection signal V8 that exceeds a given threshold voltage (Vss in this conventional example) is obtained, and a rotation detection signal of a high level is outputted from the comparator 210. In the case where the rotor 502 does not rotate, because the detection signal V8 does not reach the threshold voltage, the rotation detection signal Vs of a low level is outputted from the comparator 210. It is possible to detect whether or not the step motor rotates on the basis of the rotation detection signal Vs. After the rotation detection has been completed, the transistors Q3 and Q4 are maintained in the on-state to brake the step motor.

In a subsequent motor drive period, a subsequent normal drive pulse P1 is supplied to the input section Vi of the control circuit 103. The control circuit 103 controls the transistors Q1 and Q4 to be on, and a drive current flows in the coil 207 in an opposite direction of the above drive current (counterclockwise in FIG. 5) to thereby rotate the rotor 502 counterclockwise.

In the rotation detection period at this time, when the rotation detection control pulse SP1 is supplied to the input section Vi of the control circuit 103, the control circuit 103 controls the transistors Q4 and Q5 to be on, and controls the on/off operation of the transistor Q3 at a given frequency. In this situation, a detection voltage V is taken out from the connection point OUT2 of the resistor 208 and the coil 207, and a level of the detection voltage V is judged by the comparator 210. In the same manner as the above, in the case where the rotor 502 rotates, the rotation detection signal Vs of the high level is outputted from the comparator 210, and in the case where the rotor 502 does not rotate, the rotation detection signal Vs of the low level is outputted from the comparator 210. It is impossible to detect whether or not the step motor rotates in accordance with the rotation detection signal Vs. After the rotation detection has been completed, the transistors Q3 and Q4 are maintained in the on-state to brake the step motor.

In the step motor control device structured as described above, after the step motor has been driven by the drive pulse P1, the rotor 502 freely vibrates at a position where the rotor 502 should stop as a center. The free vibration of the rotor 502 is large immediately after the supply of the drive pulse P1 is finished, and the rotor 502 vibrates in the same direction as a normal rotation direction (counterclockwise in the above-mentioned conventional example) due to the inertia. In the case where the rotor 502 vibrates counterclockwise, the current flows in a direction indicated by an arrow in FIG. 6.

On the other hand, an equivalent circuit of the respective transistors Q3 to Q6 is made up of a series circuit comprising a switch 804 and a resistor 803, and a diode 801 and a capacitor 802 which are connected in parallel with the series circuit, respectively, as shown in FIG. 8. The respective transistors Q3 to Q6 are considered as an element equivalently having diodes in one way.

Accordingly, even though the step motor does not rotate, because the counterclockwise vibration of the rotor 502 is large within a given period immediately after the supply of the drive pulse P1 is finished, the detection voltage V7 that exceeds the threshold voltage Vss may be obtained as shown in FIG. 7. That is, in the detection signal V7 that is obtained in a given period T7 immediately after the supply of the drive pulse P1 is finished, a detection voltage having a large peak value is generated in the detection resistor 209 due to the large free vibration of the rotor 502 and misdetection is caused that the step motor is rotating.

Up to now, in order to prevent such misdetection, the control circuit has been structured such that a non-detection period IT having a given time width T7 is set immediately after the supply of the drive pulse is stopped, thereby preventing detection of the rotation of the step motor in the non-detection period IT. Accordingly, there arises such a problem that the structure of the control circuit is complicated because of the provision of the non-detection period IT.

An object of the present invention is to provide a step motor control device in which it is possible to more surely detect the rotation of the step motor with a simple structure without any provision of the non-detection period IT.

Another object of the present invention is to provide an electronic timepiece in which it is possible to more surely detect the rotation of the step motor for driving the hour hand with a simple structure.

SUMMARY OF THE INVENTION

According to the present invention, there is provided a step motor control device including: first and second switch elements which are connected to each other in series; third and fourth switch elements which are connected to each other in series; a coil of a step motor which is connected between a node of the first and second switch elements and a node of the third and fourth switch elements; a first series circuit including a fifth switch element connected in parallel with the first switch element and a first detection element; a second series circuit including a sixth switch element connected in parallel with the third switch element and a second detection element; a control means for controlling an on/off operation of the first to fourth switch elements in response to a drive pulse to allow a current to flow in the coil to rotationally drive the step motor, and controlling an on/off operation of the fourth, third, fifth, and sixth switch elements in response to a rotation detection control pulse that is supplied immediately after the supply of the drive pulse is finished in a rotation detection period immediately after the rotation drive of the step motor in accordance with the drive pulse; and a detecting means for detecting the presence/absence of the rotation of the step motor on the basis of a comparison result of a voltage generated between the first and second detection elements and the coil with a given threshold voltage.

According to one aspect of the present invention, in the case where the step motor is rotationally driven by turning on the first and fourth switch elements in accordance with the drive pulse, the control means renders the fourth and fifth switch elements on and controls the on/off operation of the third switch element at a given frequency in a first given period immediately after the supply of the drive pulse is finished, and renders the third switch element and the sixth switch element on and control the on/off operation of the fourth switch element at a given frequency in a second given period after laps of the first given period.

According to another aspect of the present invention, in the case where the step motor is rotationally driven by turning the second and third switch elements on in accordance with the drive pulse, the control means renders the third and sixth switch elements on and controls the on/off operation of the fourth switch element at a given period immediately after the supply of the drive pulse is finished, and renders the fourth switch element and the fifth switch element on in the second given period and controls the on/off operation of the third switch element at a given frequency.

According to another aspect of the present invention, the detection means detects the presence/absence of the rotation of the step motor on the basis of the comparison result of the voltage generated between the first detection element and the coil with the threshold voltage when the fifth switch element is turned on, and detects the presence/absence of the rotation of the step motor on the basis of the comparison result of the voltage generated between the second detection element and the coil with the threshold voltage when the sixth switch element is turned on.

In the case where the step motor is rotationally driven by turning on the first and fourth switch elements in accordance with the drive pulse, the control means renders the fourth and fifth switch elements on and controls the on/off operation of the third switch element at a given frequency in a first given period immediately after the supply of the drive pulse is finished, and renders the third switch element and the sixth switch element on and controls the on/off operation of the fourth switch element at a given frequency in a second given period after lapse of the first given period. In the case where the step motor is rotationally driven by turning the second and third switch elements on in accordance with the drive pulse, the control means renders the third and sixth switch elements on and controls the on/off operation of the fourth switch element at a given frequency in the first given period immediately after the supply of the drive pulse is finished, and renders the fourth switch element and the fifth switch element on and controls the on/off operation of the third switch element at the given frequency in the second given period. The detection means detects the presence/absence of the rotation of the step motor on the basis of the comparison result of the voltage generated between the first detection element and the coil with the threshold voltage when the fifth switch element is in an on state, and the detection means detects the presence/absence of the rotation of the step motor on the basis of the comparison result of the voltage generated between the second detection element and the coil with the threshold voltage when the sixth switch element is in an on state.

Here, the first, third, fifth, and sixth switch elements may be made up of n-channel MOS transistors, and the second and fourth switch elements may be made up of p-channel MOS transistors.

Further, the first and second detection elements may be made up of resistors.

Further, according to the present invention, there is provided an electronic timepiece including a step motor that rotates time hands and a step motor control device that rotationally controls the step motor, the timepiece being characterized in that any of the step motor control devices described above is used as the step motor control device.

BRIEF DESCRIPTION OF THE DRAWINGS

A preferred form of the-present invention is illustrated in the accompanying drawings in which.

DETAILED DESCRIPTION OF THE PREFERRED EMBODIMENTS

Hereinafter, an embodiment of the present invention will be described in detail with reference to the accompanying drawings.

Figure 1:
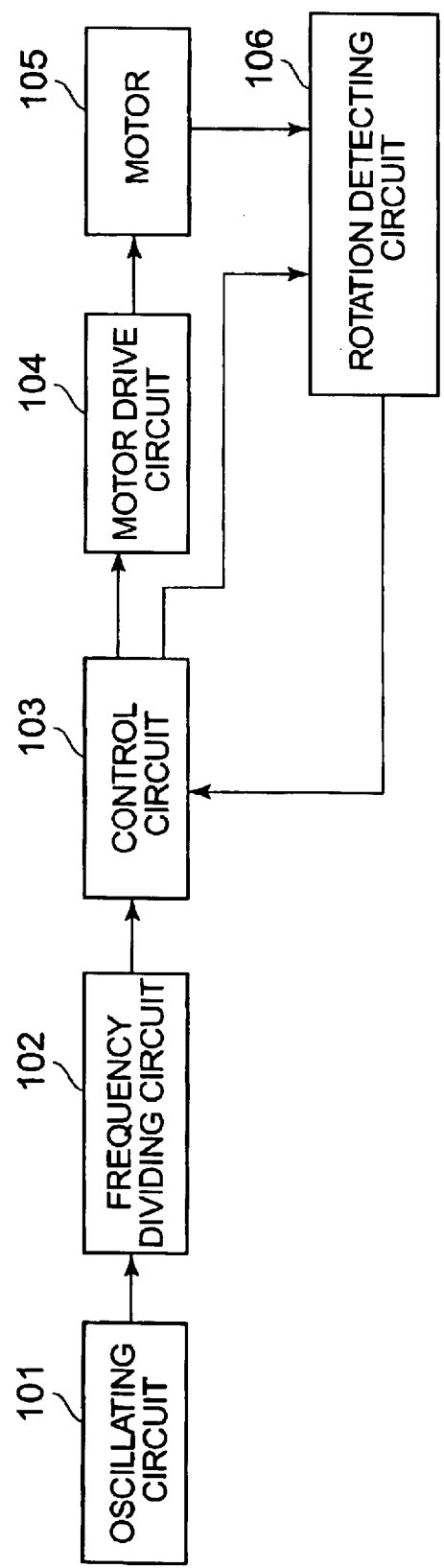
FIG. 1 is a block diagram showing an electronic timepiece in accordance with an embodiment of the present invention.

FIG. 1 is a block diagram showing an electronic timepiece using a step motor control device in accordance with an embodiment of the present invention, and shows an example of an analog electronic wristwatch.

Referring to FIG. 1, an oscillating circuit 101 is connected to an input section of a control circuit 103 through a frequency dividing circuit 102. A first output section of the control circuit 103 is connected to a step motor 105 for driving a time hand through a motor drive circuit 104. A second output section of the control circuit 103 is connected to a control input section of a rotation detecting circuit 106. The rotation detecting circuit 106 that detects whether or not the motor 105 rotates is connected between the motor 105 and the control circuit 103. The rotation detecting circuit 106 structures a rotation detecting means.

Figure 5:
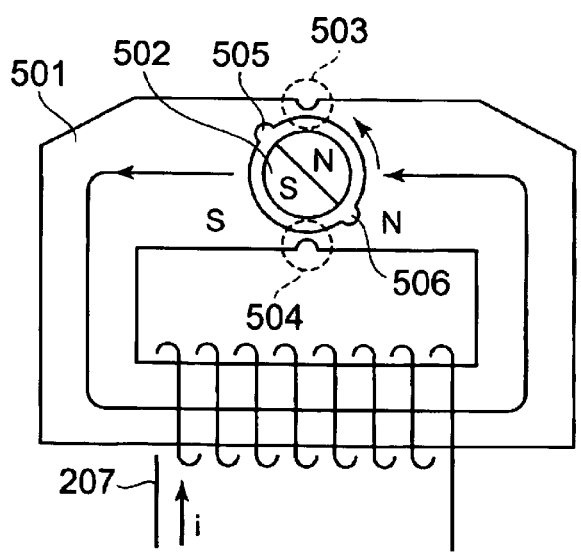
FIG. 5 is a front view showing a general step motor.
Figure 6:
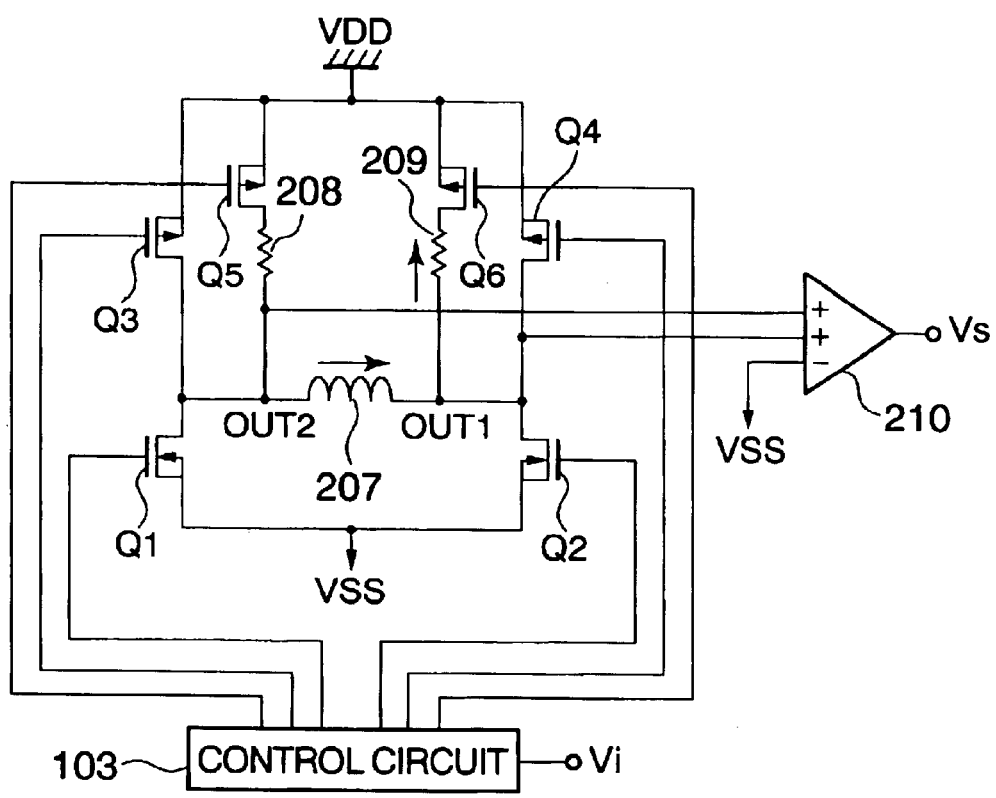
FIG. 6 is a circuit diagram for explaining the operation of a conventional step motor control device.
Figure 7:
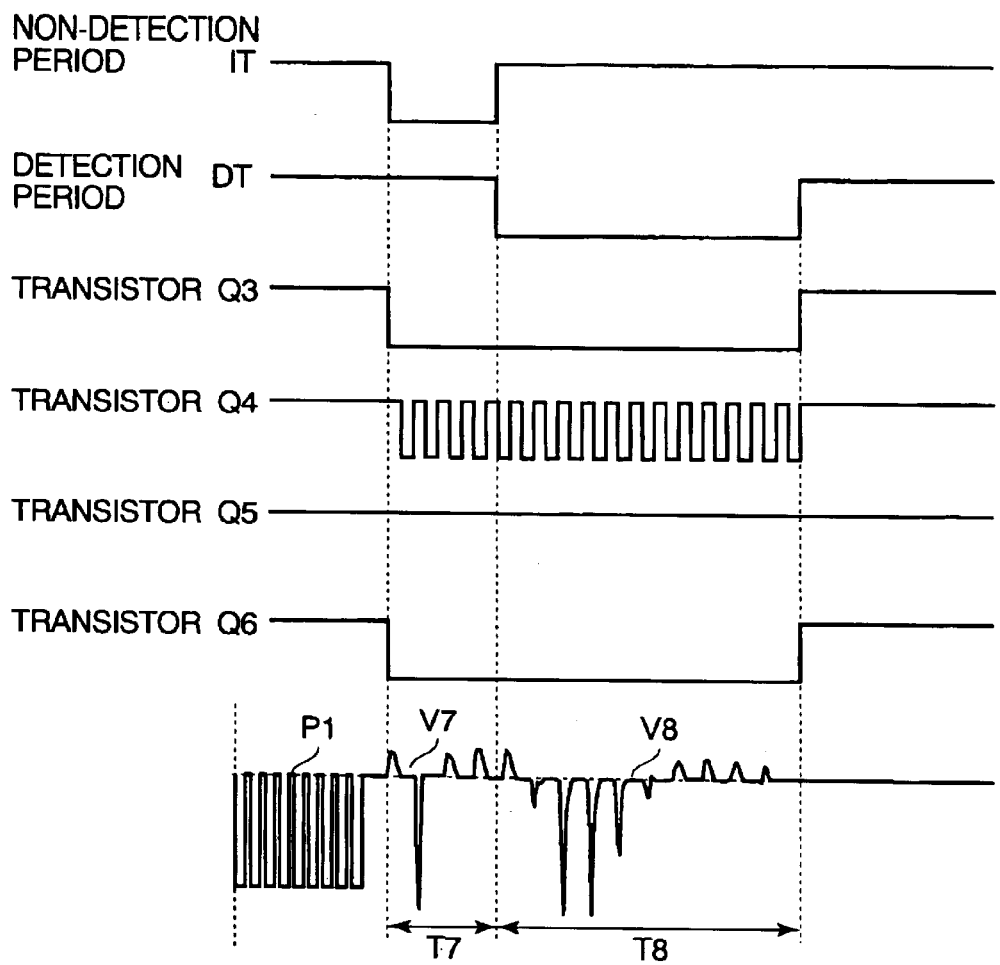
FIG. 7 is a timing chart of a conventional step motor control device.
Figure 8:
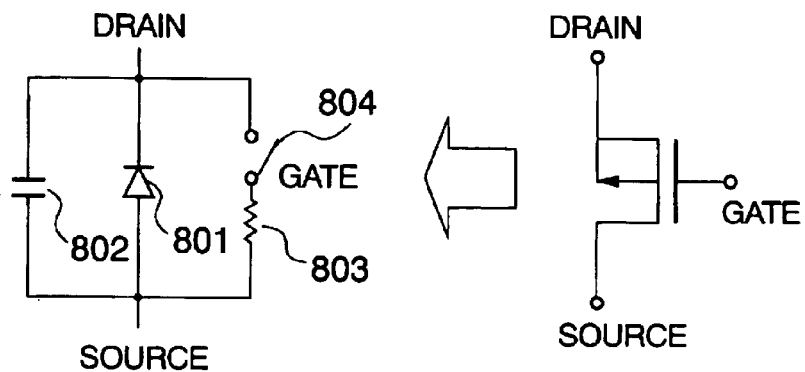
FIG. 8 is an equivalent circuit diagram of a general n-channel MOS transistor.

The step motor 105 is identical in structure with the step motor shown in FIG. 5. Also, the structure per se of the motor drive circuit 104 and the rotation detecting circuit 106 are identical with that shown in FIG. 6, but a method of controlling the on/off operation of the respective transistors Q1 to Q6 is different from the conventional example shown in FIG. 6 as will be described later.

The frequency dividing circuit 102 divides a reference clock signal from the oscillating circuit 101 and outputs the divided reference clock signal to the control circuit 103. The control circuit 103 receives a signal from the frequency dividing circuit 102 and outputs a drive pulse to the motor drive circuit 104. In the drive pulse, there are prepared a normal drive pulse P1 which is a drive pulse of a given pulse width smaller in an effective energy and a correction drive pulse that is a drive pulse of a wide width larger in the effective energy than the normal drive pulse, and the control circuit 103 selectively outputs the normal drive pulse and the correction drive pulse to the motor drive circuit 104 in accordance with a detection signal from the rotation detecting circuit 106. In this example, the control circuit 103 structures a drive pulse generating means that generates a drive pulse.

The control circuit 103 supplies to the rotation detection circuit 106 a rotation detection control pulse necessary for executing the rotation detection of the motor 105. In this example, the control circuit 103 structures a rotation detection control pulse generating means that generates means that generates the rotation detection control pulse.

The control circuit 103, the motor drive circuit 104, and the rotation detecting circuit 106 structure a control means.

Figure 2:
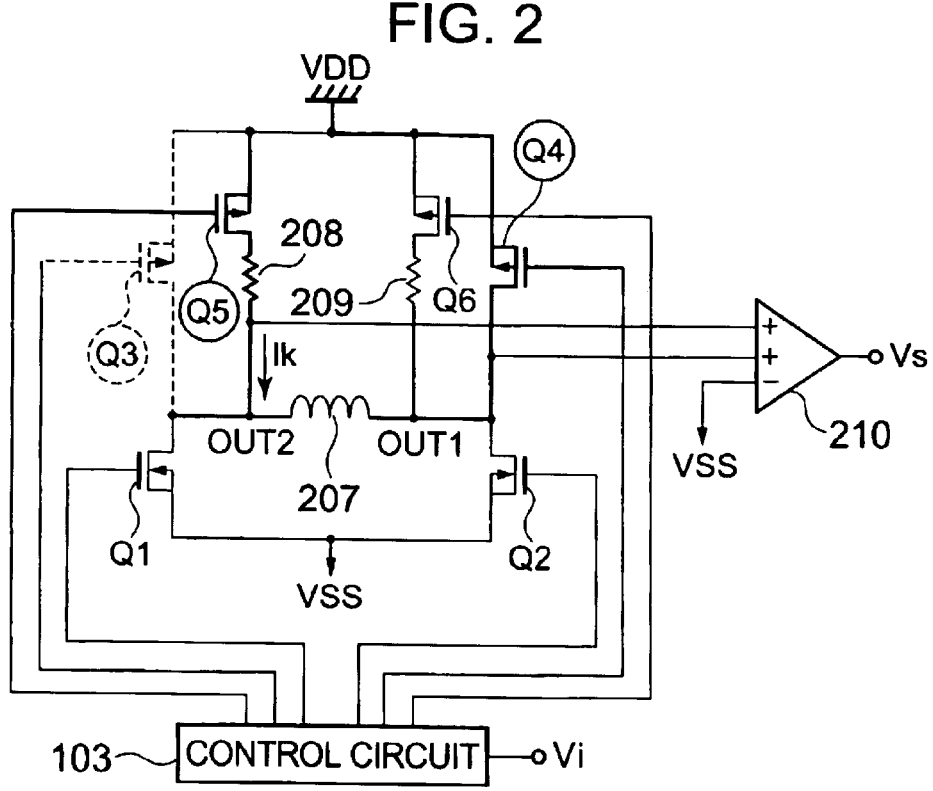
FIG. 2 is a circuit diagram for explaining the operation of the step motor control device in accordance with the embodiment of the present invention.
Figure 3:
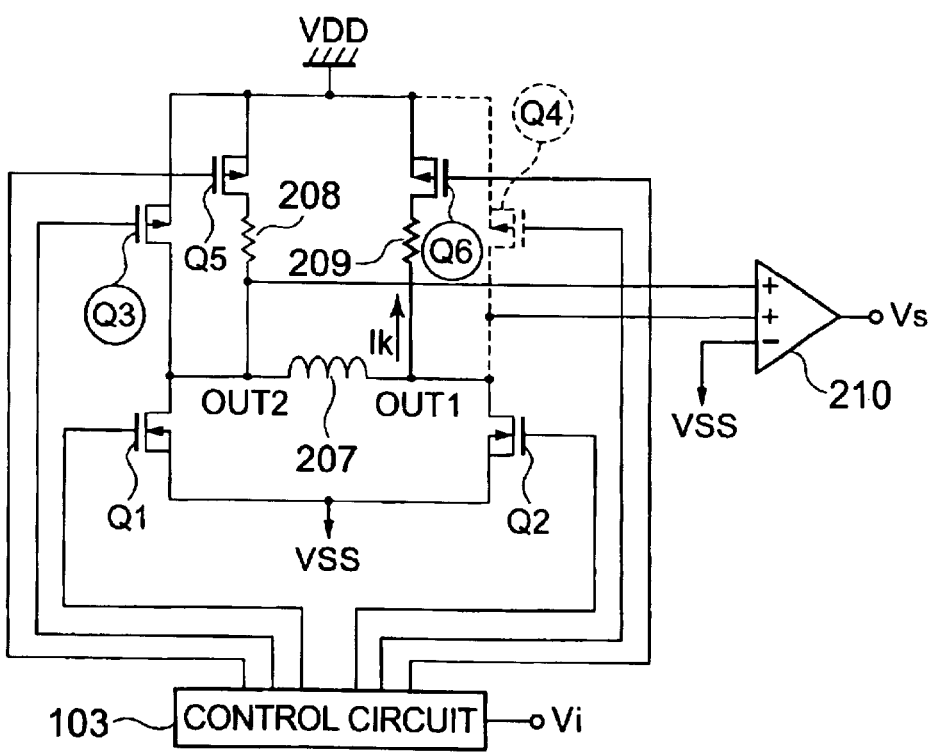
FIG. 3 is a circuit diagram for explaining the operation of the step motor control device in accordance with the embodiment of the present invention.

FIGS. 2 and 3 are explanatory diagrams showing the operation of the motor drive circuit 104 and the rotation detecting circuit 106 in the step motor control device in accordance with an embodiment of the present invention, respectively, in which FIG. 2 is an explanatory diagram showing the operation in a given period T1 immediately after a drive pulse is blocked in a rotation detection period, and FIG. 3 is an explanatory diagram showing the operation in a given period T2 immediately after lapse of the given period T1 in the rotation detection period.

In FIGS. 2 and 3, p-channel MOS transistors Q1, Q2 and n-channel MOS transistors Q3, Q4 are transistors contained in the motor drive circuit 104, and a coil 207 of the motor 105 is connected between a source connection point of the transistor Q1 and the transistor Q3 and a source connection point of the transistor Q2 and the transistor Q4.

N-transistor MOS transistors Q5, Q6, a rotation detection resistor 208 that is connected in series with the transistor Q5, a rotation detection resistor 209 connected in series with the transistor Q6, and a comparator 210 are included in the rotation detecting circuit 106.

Figure 4:
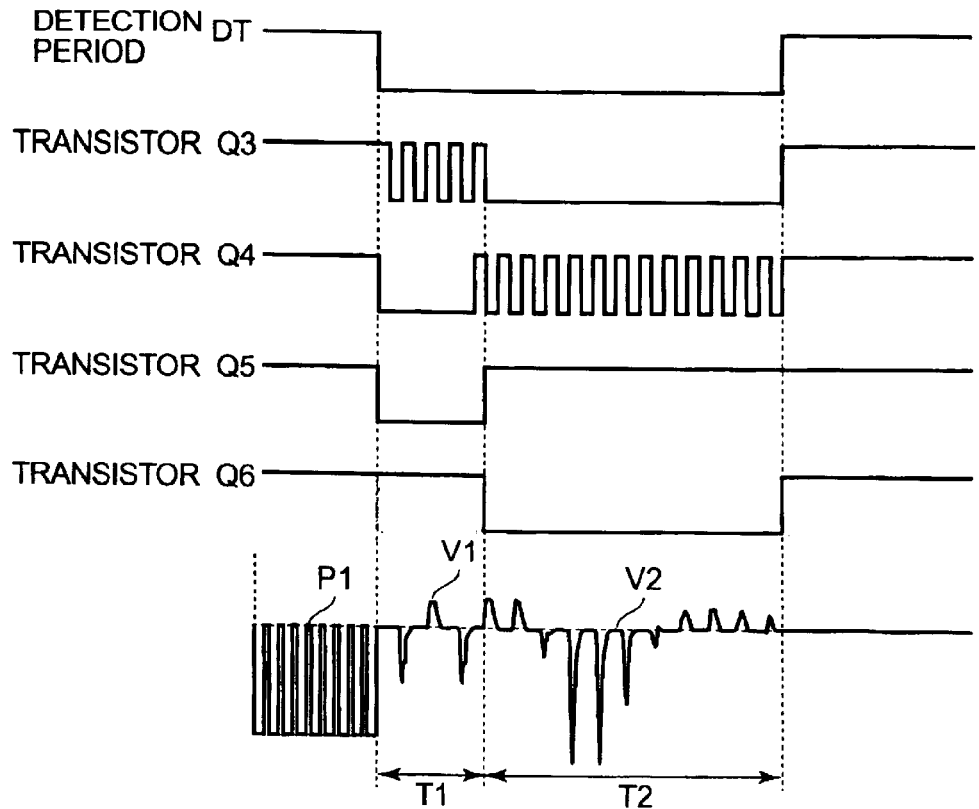
FIG. 4 is a timing chart showing the step motor control device.

FIG. 4 is a timing chart for the step motor control device in accordance with this embodiment, which is a timing chart for the case of executing the rotation detection of the motor 105 by the rotation detecting circuit 106 in response to a rotation detection control pulse SP1 after rotating the motor 105 in accordance with the normal drive pulse P1.

Hereinafter, the operation of the step motor control device and the electronic timepiece in accordance with the embodiment of the present invention will be described with reference to FIGS. 1 to 4 and FIGS. 5 and 8.

First, in a motor drive period, the normal drive pulse P1 is supplied to the motor drive circuit 104 from the control circuit 103, whereby the motor drive circuit 104 rotationally controls the motor 105. In this case, the transistors Q2 and Q3 of the motor drive circuit 104 are controlled to be on, as a result of which a drive current flows in the coil 207, and the motor 105 rotates counterclockwise (in a direction indicated by an arrow) in a front view of FIG. 5 by 180 degrees.

In a subsequent motor drive period, when a subsequent normal drive pulse P1 is supplied to the motor drive circuit 104 from the control circuit 103, the transistors Q1 and Q4 are controlled to be on, a drive current flows in the coil 207 in an opposite direction of the drive current, and the motor 105 rotates counterclockwise of the same direction by 180 degrees.

Thereafter, the above operation is repeated to continuously rotate the motor 105 counterclockwise.

On the other hand, a rotation detection period DT for detecting whether or not the motor 105 rotates (first rotation detection period T1+second rotation detection period T2) is provided immediately after the respective motor drive periods. It is possible to appropriately select the first and second rotation periods T1 and T2 in accordance with the structure of the motor at the time of designing the motor. In the rotation detection period DT, the rotation detection control pulse SP1 is supplied to the rotation detecting circuit 106 from the control circuit 103.

In the first detection period T1 immediately after the supply of the respective drive pulses P1 has been completed (immediately after the motor drive stops), the motor drive circuit 104 and the rotation detecting circuit 106 controls the transistors Q4 and Q5 to be on in response to the rotation detection control pulse SP1 from the control circuit 103 as shown in FIG. 2, and controls the on/off operation of the transistor Q3 at a given frequency in accordance with the respective fine pulses that structures the rotation detection control pulse SP1 in a state where the transistors Q4 and Q5 are turned on. In this state, the detection signal V1 generated in the rotation detection resistor 208 is taken out from the terminal OUT2.

In the first detection period T1, a loop in a direction of a current Ik is structured by the transistor Q5, the detection resistor 208, the coil 207, and the transistor Q4. In this case, because the current Ik flows in an opposite direction of an equivalent diode 801 (refer to FIG. 8) which structures the transistor Q5, the detection signal V1 is suppressed to a low voltage within a given range, and therefore the detection signal V1 of a high voltage which exceeds a given threshold value (Vss in this embodiment) is not obtained in the case where the motor does not rotate. As a result, it is possible to suppress the misdetection in the case where the motor does not rotate with a simple structure without setting the non-detection period IT even immediately after the supply of the drive pulse P1 is stopped.

In the case where the voltage of the detection signal V1 changes beyond the threshold voltage, that is, in the case where the motor 105 rotates, the rotation detection signal Vs of the high level which represents that the motor 105 rotates is outputted from the comparator 210, and after the transistors Q3 and Q4 turn on and the motor rests, the period is shifted to a subsequent motor drive period.

On the other hand, in the second detection period T2 provided immediately after lapse of the first detection period T1, the motor drive circuit 104 and the rotation detecting circuit 106 control the transistors Q3 and Q6 to be on in accordance with the rotation detection control pulse SP1 from the control circuit 103 as shown in FIG. 3, and control the on/off operation of the transistor Q4 at a given frequency in accordance with the respective fine pulses that structure the rotation detection control pulse SP1 in a state where the transistors Q3 and Q6 are turned on. In this state, the detection signal V2 generated in the rotation detection resistor 209 is taken out from the terminal OUT1.

In the second detection period T2, because a current Ik flows in a forward direction of the equivalent diode 801 that structures the transistor Q6 (refer to FIG. 8), the detection signal V2 is not limited, and therefore there is obtained the detection signal V2 of a stable voltage responsive to the rotation of the motor.

In the case where the voltage of the detection signal V2 changes beyond the threshold value, that is, in the case where the motor 105 rotates, the rotation detection signal Vs of the high level which represents that the motor 105 rotates is outputted from the comparator 210, and after the transistors Q3 and Q4 turn on and the motor rests, the period is shifted to a subsequent motor drive period.

In the case where the motor 105 does not rotate, the detection signal V2 does not exceed the threshold value over the entire detection period DT, and the rotation detection signal Vs of the low level which represents that the motor 105 is in a non-rotation state is outputted to the entire detection period DT from the comparator 210. The control circuit 103 outputs the correction drive pulse wider in width than the normal drive pulse P1 to the motor drive circuit 104 in response to the rotation detection signal Vs that is representative of non-rotation. The motor drive circuit 104 rotationally drives the motor 105 in response to the correction drive pulse.

In this manner, according to the step motor control device of this embodiment, it is possible to suppress a possibility of misjudging that the motor is rotated, in the case where the motor is not rotated, with a simple structure without providing the non-detection period IT, and it is possible to more surely detect the rotation of the step motor.

Also, according to the electronic timepiece of this embodiment, it is possible to more surely detect the rotation of the step motor for driving the hour hand with a simple structure.

In this embodiment, an example in which the step motor control device is used in the electronic timepiece was described, but it is possible to use the step motor control device in another electronic device.

According to the present invention, it is possible to more surely detect the rotation of the step motor with a simple structure without any provision of the non-detection period in the step motor control device.

Also, according to the present invention, in the electronic timepiece, it is possible to more surely detect the rotation of the step motor for driving the hour hand with a simple structure.

What is claimed is:

1. A step motor control device for controlling operation of a step motor, the step motor control device comprising:

first and second switch elements connected to each other in series;

third and fourth switch elements connected to each other in series;

a coil of a step motor, the coil being connected between a node of the first and second switch elements and a node of the third and fourth switch elements;

a first series circuit having a first detection element and a fifth switch element connected in parallel with the first switch element;

a second series circuit having a second detection element and a sixth switch element connected in parallel with the third switch element;

control means for controlling an on/off operation of the first to fourth switch elements in response to a supplied drive pulse to allow a current to flow in the coil to rotationally drive the step motor, and for controlling an on/off operation of the third, fourth, fifth and sixth switch elements in response to a rotation detection control pulse supplied during a rotation detection period immediately after the rotational drive of the step motor in accordance with the supplied drive pulse is completed; and detecting means for detecting the presence/absence of the rotation of the step motor in accordance with a comparison result obtained by comparing a threshold voltage with a voltage generated between the coil and the first detection element of the first series circuit and with a voltage generated between the coil and the second detection element of the second series circuit.

2. A step motor control device according to claim 1; wherein each of the first, third, fifth, and sixth switch elements comprises an n-channel MOS transistor; and wherein each of the second and fourth switch elements comprises a p-channel MOS transistor.

3. A step motor control device according to claim 1; wherein each of the first and second detection elements comprises a resistor.

4. An electronic timepiece comprising: a plurality of hands for indicating time; a step motor for rotating the hands; and a step motor control device according to claim 1 for controlling operation of the step motor.

5. A step motor control device according to claim 1; wherein when the step motor is rotationally driven by turning on the first and fourth switch elements in accordance with the drive pulse, the control means turns the fourth and fifth switch elements on and controls the on/off operation of the third switch element at a given frequency in a first given period immediately after the supply of the drive pulse is completed, and the control means turns the third switch element and the sixth switch element on and controls the on/off operation of the fourth switch element at a given frequency in a second given period after lapse of the first given period.

6. A step motor control device according to claim 5; wherein when the step motor is rotationally driven by turning on the second and third switch elements in accordance with the drive pulse, the control means turns on the third and sixth switch elements and controls the on/off operation of the fourth switch element at a given frequency in the first given period immediately after the supply of the drive pulse is completed, and the control means turns on the fourth switch element and the fifth switch element in the second given period and controls the on/off operation of the third switch element at a given frequency.

7. A step motor control device according to claim 6; wherein the detecting means detects the presence/absence of the rotation of the step motor in accordance with the comparison result obtained by comparing the threshold voltage with the voltage generated between the first detection element and the coil when the fifth switch element is turned on; and wherein the detecting means detects the presence/absence of the rotation of the step motor in accordance with the comparison result obtained by comparing the threshold voltage with the voltage generated between the second detection element and the coil when the sixth switch element is turned on.

8. A step motor control device according to claim 7; wherein each of the first, third, fifth, and sixth switch elements comprises an n-channel MOS transistor; and wherein each of the second and fourth switch elements comprises a p-channel MOS transistor.

9. A step motor control device according to claim 7; wherein each of the first and second detection elements comprises a resistor.

10. An electronic timepiece comprising: a plurality of hands for indicating time; a step motor for rotating the hands; and a step motor control device according to claim 7 for controlling operation of the step motor.

11. A step motor control device according to claim 1; further comprising comparing means for comparing the threshold voltage with the voltage generated between the coil and the first detection element of the first series circuit and with a voltage generated between the coil and the second detection element of the second series circuit.

12. A control device for a step motor having a coil, the control device comprising:
   first and second switch elements connected to each other in series, a node of the first and second switch elements being connected to one side of the coil during use of the control device;
   third and fourth switch elements connected to each other in series, a node of the third and fourth switch elements being connected to the other side of the coil during use of the control device;
   a first series circuit having a first detection element and a fifth switch element connected in parallel with the first switch element;
   a second series circuit having a second detection element and a sixth switch element connected in parallel with the third switch element;
   control means for controlling operation of each of the first and fourth switch elements during a step motor drive period to turn the first and fourth switch elements ON to allow a current to flow in the coil for rotationally driving the step motor, for controlling operation of each of the fourth and fifth switch elements to turn the fourth and fifth switch elements ON and controlling an ON/OFF operation of the third switch element during a first step motor rotation detection period immediately after the rotational drive of the step motor is stopped, and for controlling operation of each of the third and sixth switch elements to turn the third and sixth switch elements ON and controlling an ON/OFF operation of the fourth switch element during a second step motor rotation detection period after lapse of the first step motor rotation detection period;
   comparing means for comparing a threshold voltage with the voltage generated between the coil and the first detection element of the first series circuit when the fifth switch element is turned ON, and for comparing a threshold voltage with the voltage generated between the coil and the second detection element of the second series circuit when the sixth switch element is turned ON; and
   detecting means for detecting a rotational driving state of the step motor in accordance with a voltage comparison result from the comparing means.

13. A control device according to claim 12; wherein each of the first, third, fifth, and sixth switch elements comprises an n-channel MOS transistor; and wherein each of the second and fourth switch elements comprises a p-channel MOS transistor.

14. A control device according to claim 12; wherein each of the first and second detection elements comprises a resistor.

15. An electronic timepiece comprising: a plurality of hands for indicating time; a step motor for rotating the hands; and a control device according to claim 12 for controlling an operation of the step motor.

16. A control device for a step motor having a coil, the control device comprising:
   first and second switch elements connected to each other in series, a node of the first and second switch elements being connected to one side of the coil during use of the control device;
   third and fourth switch elements connected to each other in series, a node of the third and fourth switch elements being connected to the other side of the coil during use of the control device;

a first series circuit having a first detection element and a fifth switch element connected in parallel with the first switch element;

a second series circuit having a second detection element and a sixth switch element connected in parallel with the third switch element;

control means for controlling operation of each of the second and third switch elements during a step motor drive period to turn the second and third switch elements ON to allow a current to flow in the coil for rotationally driving the step motor, for controlling operation of each of the third and sixth switch elements to turn the third and sixth switch elements ON and controlling an ON/OFF operation of the fourth switch element during a first step motor rotation detection period immediately after the rotational drive of the step motor is stopped, and for controlling operation of each of the fourth and fifth switch elements to turn the fourth and fifth switch elements ON and controlling an ON/OFF operation of the third switch element during a second step motor rotation detection period after lapse of the first step motor rotation detection period;

comparing means for comparing a threshold voltage with the voltage generated between the coil and the first detection element of the first series circuit when the fifth switch element is turned ON, and for comparing a threshold voltage with the voltage generated between the coil and the second detection element of the second series circuit when the sixth switch element is turned ON; and detecting means for detecting a rotationally driving state of the step motor in accordance with a voltage comparison result from the comparing means.

17. A control device according to claim 16; wherein each of the first, third, fifth, and sixth switch elements comprises an n-channel MOS transistor; and wherein each of the second and fourth switch elements comprises a p-channel MOS transistor.

18. A control device according to claim 16; wherein each of the first and second detection elements comprises a resistor.

19. A control device according to claim 16; wherein the control means comprises a motor drive circuit, a rotation detecting circuit, and a control circuit for controlling the motor drive circuit to rotationally drive the step motor and controlling the rotation detecting circuit to detect the rotational driving state of the step motor.

20. An electronic timepiece comprising: a plurality of hands for indicating time; a step motor for rotating the hands; and a control device according to claim 16 for controlling operation of the step motor.

* * * * *